US011133926B2

(12) United States Patent
Le Van Gong et al.

(10) Patent No.: US 11,133,926 B2
(45) Date of Patent: Sep. 28, 2021

(54) ATTRIBUTE-BASED KEY MANAGEMENT SYSTEM

(71) Applicant: PayPal, Inc., San Jose, CA (US)

(72) Inventors: Hubert A. Le Van Gong, San Jose, CA (US); Shiwen Michael Thang, Singapore (SG)

(73) Assignee: PayPal, Inc., San Jose, CA (US)

(*) Notice: Subject to any disclaimer, the term of this patent is extended or adjusted under 35 U.S.C. 154(b) by 313 days.

(21) Appl. No.: 16/180,454

(22) Filed: Nov. 5, 2018

(65) Prior Publication Data
US 2020/0145200 A1 May 7, 2020

(51) Int. Cl.
H04L 9/14 (2006.01)
H04L 9/08 (2006.01)
H04L 9/30 (2006.01)
G06F 21/60 (2013.01)
G06F 21/62 (2013.01)

(52) U.S. Cl.
CPC .......... H04L 9/0825 (2013.01); G06F 21/602 (2013.01); G06F 21/6209 (2013.01); G06F 21/6218 (2013.01); H04L 9/14 (2013.01); H04L 9/30 (2013.01); H04L 9/088 (2013.01); H04L 9/3073 (2013.01)

(58) Field of Classification Search
CPC ......... H04L 9/08; H04L 9/0825; H04L 9/088; H04L 9/30; H04L 9/14; H04L 9/3073; H04L 9/0827; G06F 21/602; G06F 21/6209; G06F 21/645; G06F 21/6218
See application file for complete search history.

(56) References Cited

U.S. PATENT DOCUMENTS

| 8,302,169 B1* | 10/2012 | Presotto ............... H04L 63/102 726/5 |
| 10,764,037 B2* | 9/2020 | Yan ........................ H04L 9/088 |
| 2012/0144210 A1* | 6/2012 | Yacobi .................. H04L 9/3073 713/193 |
| 2012/0260094 A1* | 10/2012 | Asim ...................... H04L 9/088 713/171 |
| 2016/0055347 A1* | 2/2016 | Park ...................... H04L 9/0825 713/165 |
| 2018/0206576 A1* | 7/2018 | Dextraze ................ A42B 3/042 |
| 2019/0394020 A1* | 12/2019 | Lepoint ................. H04L 9/0618 |

* cited by examiner

Primary Examiner — Kristine L Kincaid
Assistant Examiner — Shaqueal D Wade
(74) Attorney, Agent, or Firm — Haynes and Boone, LLP

(57) ABSTRACT

Systems and methods for encrypting and decrypting a data encryption key are provided. A data encryption key used to encrypt data is encrypted using a first asymmetric key and a policy. The policy includes rules that correspond to attributes. A second asymmetric key is associated with the attributes. To decrypt the encrypted data encryption key, the attributes are used to identify the second asymmetric key. The attributes are also used to pass the rules in the policy included in the encrypted data encryption key. If the attributes pass the rules in the policy, the encrypted data encryption key is decrypted. The decrypted data encryption key can then decrypt the encrypted data.

19 Claims, 13 Drawing Sheets

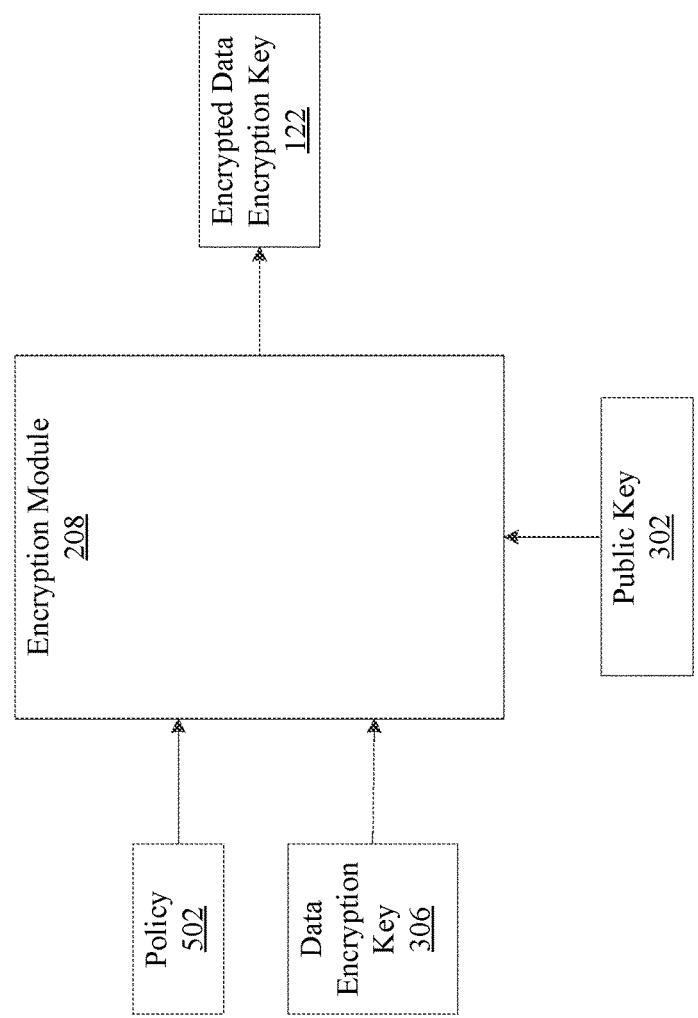

ATTRIBUTE-BASED KEY MANAGEMENT SYSTEM

TECHNICAL FIELD

The disclosure generally relates to data security, and more specifically to attribute-based encryption.

BACKGROUND

A conventional key management system includes data encryption keys and key encryption keys. Data encryption keys may encrypt and decrypt data, while key encryption keys may encrypt and decrypt data encryption keys. Conventionally, encrypted data and encrypted data encryption keys may be stored in a database or in cloud storage, while the key encryption keys may be stored in a secure environment within the key management system. In this way, users may use user credentials to access the key management system and key encryption keys. Once accessed, the key management system may use key encryption keys to decrypt data encryption keys. The decrypted data encryption key may then decrypt data.

In the encryption and decryption mechanism described above, access to key encryption keys dictates access to decrypting data. Accordingly, controlling who has access to key encryption keys is paramount. This mechanism, however, does not scale well to multiple users or applications. This is because as long as the users or applications can access the key encryption key, the users and application can access data.

What is needed is a more granular approach for accessing key encryption keys and data.

BRIEF DESCRIPTION OF THE DRAWINGS

FIG. 6A-B are block diagrams of an encryption module, according to some embodiments.

Figure 1:
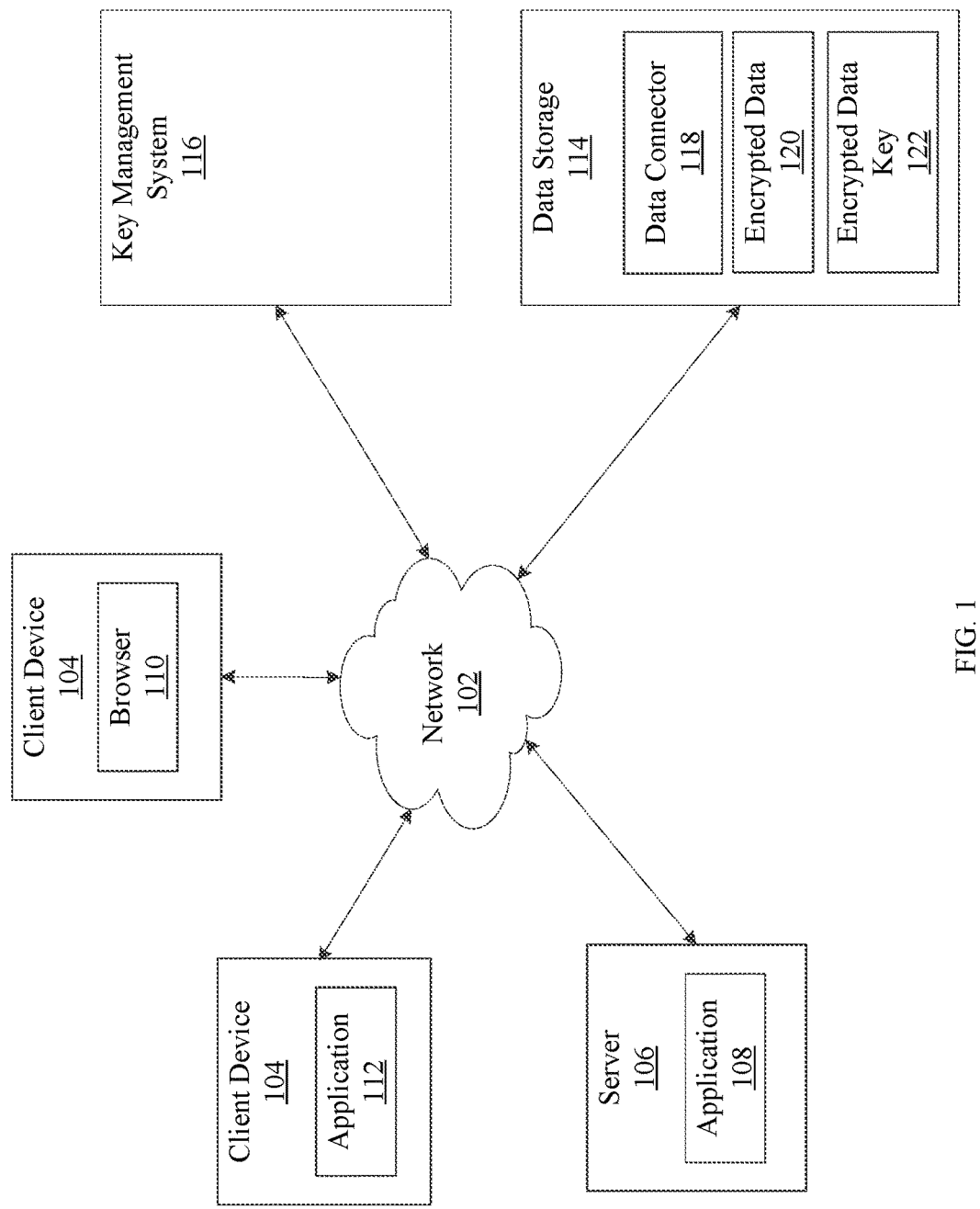
FIG. 1 is an exemplary system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Embodiments are directed to a key management system that encrypts and decrypts a data encryption key using key encryption keys that are associated with policies and attributes. A data encryption key may be a symmetric key that encrypts and decrypts data that is stored in data storage, such as cloud storage. The data may be associated with an application and that is encrypted to be stored securely in data storage. A data encryption key may also be a number of keys, such as asymmetric public and private keys that encrypt and decrypt data.

In an embodiment, key encryption keys may include a public key that is associated with one or more private keys. The private keys may be associated with attributes. There may be a different number of attributes associated with each private key. Example attributes may be attributes included in a client certificate, credentials such as user credentials, application credentials, client device credentials, etc.

In an embodiment, the key management system may contain policies. Each policy may include rules that are associated with attributes. The value of the attributes may determine whether the rules in the policy are passed or failed.

In an embodiment, the key management system may encrypt the data encryption key into the encrypted data encryption key using a public key and a policy. The encrypted data encryption key may be stored in a data storage that is the same or different data storage as the data storage that stores the encrypted data.

In an embodiment, before the encrypted data is decrypted, the key management system decrypts the encrypted data encryption key so that the decrypted data encryption key may decrypt the data. As such, in order to decrypt the encrypted data encryption key, the key management system may receive attributes and the encrypted data encryption key. The key management system may receive the attributes that were extracted from a client certificate or credentials discussed above. The key management system may use the received attributes to identify a private key that is associated with the same attributes. Once the private key is identified, the key management system may use the private key and the received attributes to decrypt the encrypted data encryption key. For instance, the key management system may determine whether the attributes match the rules in the policy. If the attributes match the rules in the policy, the key management system may use the private key to decrypt the encrypted data encryption key. The decrypted data encryption key may then be used to decrypt the data encrypted by the data encryption key.

The embodiments above describe a more granular approach to accessing the key encryption keys. This is because access to the key encryption keys depends on the attributes obtaining a private key that is specific to the attributes and then the attributes passing the rules in the policy encrypted using the corresponding public key. In this way, access to the key encryption keys may be tailored to a user, application, etc., that has the corresponding attributes that pass the policy. This granular approach is unlike conventional techniques where a user or application obtains access to the key encryption keys by authenticating with the conventional key management system.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network.

In an embodiment, one or more client devices 104 may be connected to network 102. Client devices 104 may be portable and non-portable electronic devices under control of a user and configured to generate, transmit, store, receive, etc., data from various computing devices over network 102. Example client devices 104 include desktop computers, laptop computers, tablets, smartphones, wearable computing devices, eyeglasses that incorporate computing devices, implantable computing devices, etc.

In an embodiment, system 100 may include one or more servers 106. Server 106 may be a computing program or a device that communicates with one or more client devices 104. Servers 106 may provide client devices 104 or applications that execute on client devices 104 with one or more services, such as providing data, manipulating data, sharing data among client devices 104, etc. Example servers 106 may be application servers, cloud based servers, mail servers, web servers, application servers, game servers, etc. In some embodiments, one or more servers may be under control of PayPal Holdings, Inc.

In an embodiment, servers 106 may include one or more applications, such as application 108. Application 108 may execute on server 106 and provide resources, such as data and/or services to one or more client device 104. Example application 108 may be a web mail application, online retail application, transaction processing application, payment processing application, instant messaging application, online auction application, etc. Although system 100 illustrates a single application 108, system 100 may include multiple applications 108 on multiple servers 106.

As discussed above, application 108 may provide data and/or services to client devices 104. In one embodiment, application 108 may interface with a browser 110 that executes on client device 104. Browser 110 may be an application for accessing information including data and services over a world wide web and displaying the information in a web page. For example, browser 110 may access information from application 108 via a distinct uniform resource locator ("URL") associated with the location of application 108. In another example, client device 104 may include a client device counterpart to application 108, such as application 112. Application 112 may be downloaded to client device 104 from server 106 or another server. Once downloaded, application 112 may communicate over network 102 with application 108 and display, manipulate, send, or receive information from application 108 and vice versa. Although system 100 illustrates application 112 on a single client device 104, system 100 is not limited to this embodiment, and applications 112 may be on distinct and/or multiple client devices 104.

As discussed above, data may be transmitted between application 108 and browser 110 and application 108 and application 112. In some embodiments, data associated with applications 108 and/or 112 may be stored on one or more client devices 104, servers 106, or data storage 114. Data storage 114 may be cloud storage, a database, and/or another type of large scale storage that may be accessible to applications 108 and 112 over network 102.

In an embodiment, data may be sensitive data and may be stored securely on client device 104, server 106 or data storage 114. Similarly, sensitive data may be transmitted securely between various components of system 100. To store or transmit data securely, system 100 may include a key management system 116. Key management system 116 may manage one or more encryption keys, decryption keys and one or more cryptographic algorithms that are used for encryption and decryption. Encryption keys may encrypt data or other keys into unreadable format known as ciphertext. Because ciphertext may be decrypted only by entities that have or can access a decryption key, ciphertext may be stored securely on client devices 104, servers 106 and/or data storage 114. For example, data from applications 108, 112, etc., that is encrypted into ciphertext may be stored in data storage as encrypted data 120 and data encryption keys encrypted into cipher text may be stored as encrypted data encryption keys 122. Decryption keys may decrypt encrypted data 120 into data, or encrypted data encryption keys 122 into keys. Typically, decrypted data may be data in its original form, such as plaintext, that may be legibly viewed or manipulated by applications 108, 112 and/or browser 110.

In an embodiment, key management system 116 may generate data encryption and decryption keys. Data encryption keys encrypt data, while data decryption keys decrypt data. In some embodiments, data encryption keys and data decryption keys may be symmetric keys. In this case, the data encryption key and the data decryption key are the same key, referred to as simply a data encryption key. Once key management system 116 generates a data encryption key, key management system 116 may provide the data encryption key to a data owner. A data owner may be application 108 or application 112 in some embodiments. The data owner may encrypt data using the data encryption key and also provide the data encryption key (or access to the data encryption key) to a user or an application that can decrypt the data. In another embodiment, key management system 116 may provide data storage 114 with the data encryption key and data storage 114 may use the data encryption key to encrypt and decrypt data.

In some embodiments, encrypted data may be stored securely within data storage 114. To store data security, data storage 114 may include a data connector 118. Data connector 118 may be an application that connects client devices 104, servers 106 and/or key management system 116 to data storage 114.

In an embodiment, key management system 116 may also generate key encryption keys and key decryption keys. Although system 100 includes a single key management system 116, the implementation is not limited to this embodiment, and different key management system 116 may generate data encryption keys and key encryption and decryption keys.

In an embodiment, the key encryption key and the key decryption key may be asymmetric keys. In this case, the key encryption key and the key decryption key work in tandem, where the key encryption key performs encryption while the key decryption key performs decryption.

In an embodiment, the key encryption key may encrypt the data encryption key into cipher text. Once encrypted, the encrypted data encryption key 122 may be stored in data storage 114 via data connector 118. The key decryption key may decrypt the encrypted data encryption key 122. To decrypt encrypted data encryption key 122, key management system 116 may retrieve encrypted data encryption key 122 from data storage 114 via data connector 118. Once retrieved, key management system 116 may use the key decryption key to decrypt encrypted data encryption key 122. Alternatively, key management system 116 may securely transmit the key decryption key to data connector 118 or data storage 114 and data connector 118 or data storage 114 may use the transmitted key decryption key to decrypt data encryption key 122.

Unlike a conventional key management system, key management system 116 may associate key encryption keys with policies that include one or more rules associated with attributes, and key decryption keys with the attributes in the policies. The attributes allow key decryption keys to decrypt encrypted data encryption key 122 as long as the attributes pass the rules included in the policy during the decryption process. Using policies with key encryption keys to encrypt data encryption keys into encrypted data encryption keys 122, and attributes and key decryption keys to decrypt encrypted data encryption keys 122 may provide fine-tuned access control to data encryption keys, and ultimately to data, that scales to multiple users, as further discussed below.

Figure 2:
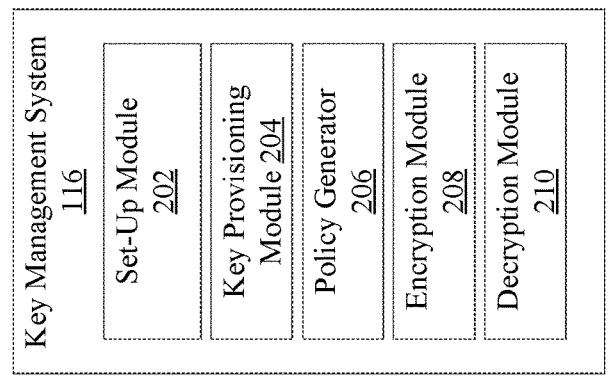
FIG. 2 a block diagram of a key management system, according to an embodiment.

FIG. 2 is a block diagram 200 of a key management system, according to an embodiment. As illustrated in FIG. 2, key management system 116 may include a set-up module 202, a key provisioning module 204, a policy generator 206, an encryption module 208, and a decryption module 210. Set-up module 202, key provisioning module 204, policy generator 206, encryption module 208, and decryption module 210 may be included in or execute on one or more components described in FIG. 10. Although set-up module 202, key provisioning module 204, policy generator 206, encryption module 208, and decryption module 210 are illustrated as included in key management system 116, these modules may be distributed within different components and/or devices described in FIG. 1.

Figure 3:
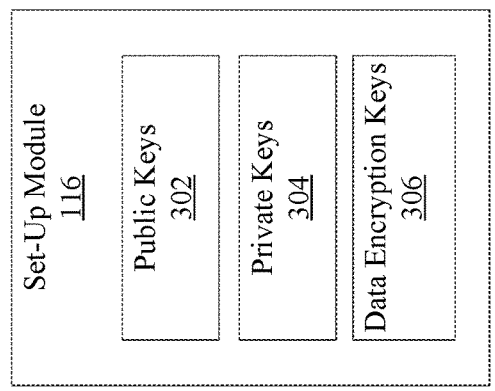
FIG. 3 is a block diagram of a set-up module, according to an embodiment.

In an embodiment, set-up module 202 may generate data encryption keys, key encryption keys, and/or key decryption keys. FIG. 3 is a block diagram 300 of a set-up module, according to an embodiment. As illustrated in FIG. 3, set-up module 202 may generate key encryption keys and key decryption keys, which are public keys 302 and private keys 304 respectively. In an embodiment, public keys and private keys 304 may be asymmetric keys. Asymmetric keys may be keys where data or keys encrypted by public key 302 may be decrypted by a corresponding private key 304 or vice versa.

In an embodiment, set-up module 202 may also associate private keys 304 with public keys 302. For example, set-up module 202 may associate one or more private keys 304 with a single public key 302.

In an embodiment, set-up module 202 may also generate data encryption keys 306. As discussed above, although set-up module 202 may generate data encryption keys 306, public keys 302, and private keys 304, the implementation is not limited to this embodiment, and data encryption keys 306 may be generated by another set-up module that is different from set-up module 202. As discussed above, data encryption keys 306 may be keys that encrypt data into ciphertext and decrypt the encrypted data from ciphertext into its original form. As discussed above, data encryption keys 306 may be symmetric or asymmetric keys, though the non-limiting embodiments described herein describe data encryption keys 306 as symmetric keys. Once set-up module 202 generates data encryption keys 306, key management system 116 discussed above may provide data encryption keys 306 to applications 108 or 112, and/or data storage 114 discussed in FIG. 1 to encrypt data.

Figure 4:
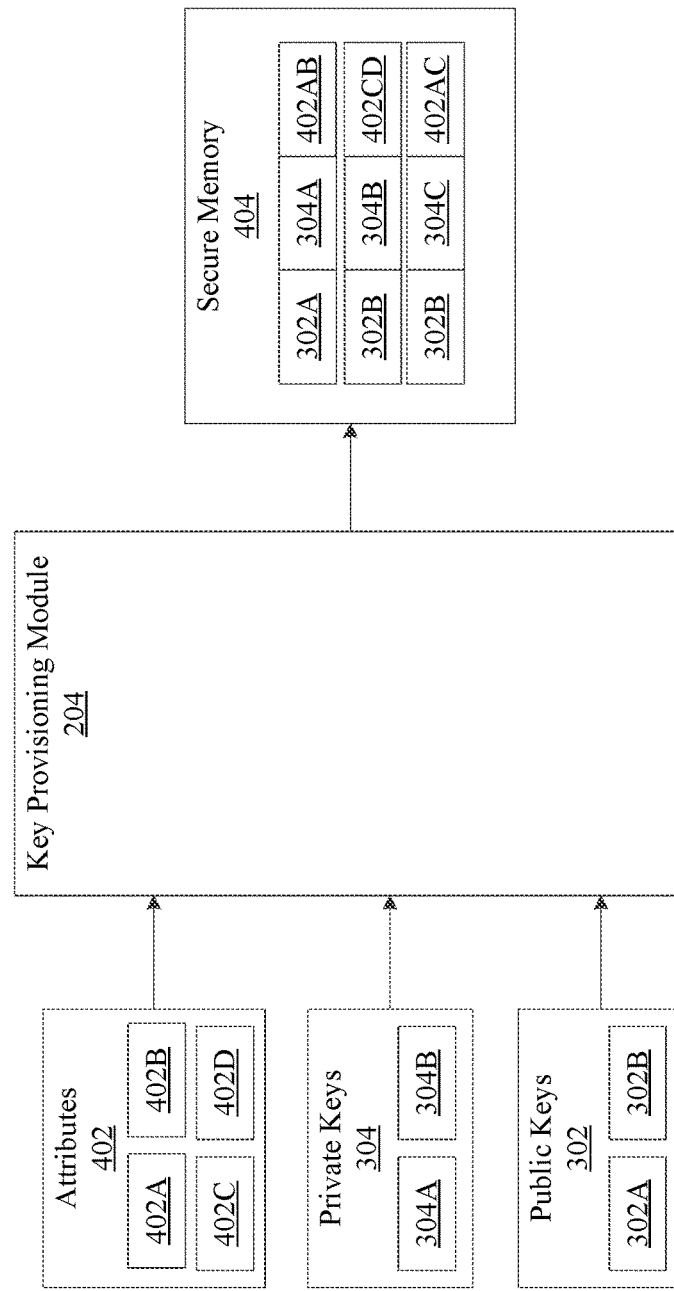
FIG. 4 is a block diagram of a key provisioning module, according to an embodiment.

Going back to FIG. 2, in an embodiment, key provisioning module 204 of key management system 116 may provision private key 304 with one or more attributes. FIG. 4 is a block diagram 400 of a key provisioning module, according to an embodiment. As illustrated in FIG. 4, key provisioning module 204 may receive one or more private keys 304, such as private key 304A and 304B, and one or more attributes 402, such as attributes 402A-D. The attributes 402 may be attributes of a user using applications 108 or accessing application 112, attributes of client devices 104, servers 106, etc. In an embodiment, attributes 402 may be included in a client certificate or credentials, such as user credentials or application credentials.

In an embodiment, key provisioning module 204 may assign one or more attributes 402 to private keys 304. In some embodiments, key provisioning module 204 may assign different attributes to different private keys 304. For example, key provisioning module 204 may assign attributes 402A and 402B to private key 304A and attributes 402C and 402D to private key 304B. In other embodiments, key provisioning module may assign overlapping attributes to different private keys 304. For example, key provisioning module 204 may assign attributes 402A and 402C to private key 304C.

In an embodiment, once attributes 402 are assigned to private keys 304, private keys 304 use attributes 402 to decrypt or unwrap encryption data encryption key 122 into data encryption key 306. For the purposes of the embodiments described herein, decrypting encrypted data encryption key 122 may be synonymous with unwrapping encrypted data encryption key 122. For example, private key 304A may use attributes 402A and 402B to decrypt data encryption key 306.

In an embodiment, key provisioning module 204 may also associate public keys 302 with private keys 304. Notably, this functionality may also be included in set-up module 202. For example, key provisioning module 204 may associate public key 302A with private key 304A and public key 302B with private key 304B. Key provisioning module 204 may also associate the same public key, such as public key 302B, with multiple private keys 304, such as private keys 304B and 304C.

In an embodiment, public keys 302, corresponding to private key(s) 304 and attributes 402 assigned to private key(s) 304, may be used to encrypt or wrap data encryption keys 306. For the purposes of the embodiments described here, encrypting data encryption keys 306 may be synonymous with wrapping data encryption keys 306.

In an embodiment, because private keys 304 may be sensitive, key management system 116 may store private keys 304 provisioned with attributes 402 in secure memory 404. Secure memory 404 may be one of memory storages described in FIG. 10, but that is secured by being isolated in computer hardware or software, and/or accessible securely to key management system 116, but not other applications or software. In a further embodiment, key provisioning module 204 may also store public keys 302 in secure memory 404.

Figure 5:
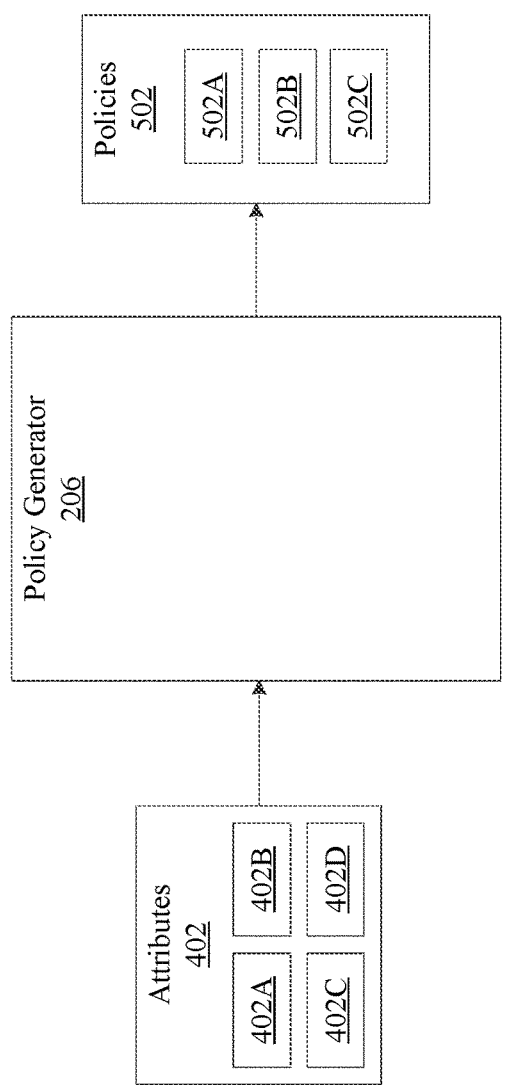
FIG. 5 is a block diagram of a policy generator, according to an embodiment.

Going back to FIG. 2, key management system 116 may also include policy generator 206, in one embodiment. In other embodiments, policy generator 206 may also be included in other components in system 100, such as application 112, data connector 118 or data storage 114 (not shown). Policy generator 206 may generate one or more policies. FIG. 5 is a block diagram 500 of a policy generator, according to an embodiment. As illustrated in FIG. 5, policy generator 206 may receive one or more attributes 402. Example attributes may be attributes 402A, 402B, 402C, and 402D.

In an embodiment, policy generator 206 may generate policies 502. Policies 502 may include one or more rules where the outcome depends on attributes 402. An example rule may include "if" "else" statements in some embodiments. Another example rule may verify if one or more attributes exist. For example, policy generator 206 may generate policy 502A that includes a rule for determining if attribute 402A is greater than thirty, and attribute 402B is less than 10. In another example, policy generator 206 may generate policy 502B that includes rules that depend on attributes 402C and 402D. For example, policy 502B may include a rule that determine whether attribute 402C is greater than 1000 and whether attribute 402D include an identifier of application 112. In another example, policy 502C may include a rule that identifies that an attribute 402A that includes an employee identifier was issued after Sep. 1, 2010 and whether attribute 402C is greater than 100. There may be other types of rules in policies 502 that rely on or include attributes 402, and policies are not limited to the above embodiments.

In some embodiments, policies 502 and/or rules within policies 502 may have various structures. Example structure may be non-monotonic trees that have attributes 402 as end nodes.

Going back to FIG. 2, key management system 116 includes encryption module 208. FIG. 6A is a block diagram 600A of an encryption module, according to an embodiment. Encryption module 208 may encrypt data encryption key 306. As discussed above, data encryption key 306 may encrypt data associated with applications 108 or 112 into encrypted data encryption key 122 and decrypt encrypted data encryption key 122 into the original data.

In an embodiment, encryption module 208 may receive data encryption key 306 from data storage 114 via data connector 118, application 108, application 112, etc., (not shown). In an embodiment, encryption module 208 may also receive policy 502 and public key 302. Encryption module 208 may then use public key 302 to encrypt data encryption key 306 into encrypted data encryption key 122 according to policy 502. In an embodiment, encryption module 208 may use one or more attribute-based encryption algorithms. Although embodiments discussed below use public key 302 to encrypt data encryption key 306, the implementation is not limited to this embodiment, and private key 304 may also encrypt data encryption key 306 into encrypted data encryption key 122, in which case public key 302 may decrypt encrypted data encryption key 122 into data encryption key 306.

In an embodiment, once encryption module 208 generates encrypted data encryption key 122, key management system 116 may store encrypted data encryption key 122 in data storage 114, server 106, client device 104, or other components of system 100 discussed in FIG. 1. For example, key management system 116 may transmit encrypted data encryption key 122 to data connector 118 of FIG. 1, and data connector 118 may store encrypted data encryption key in data storage 114.

Figure 6B:
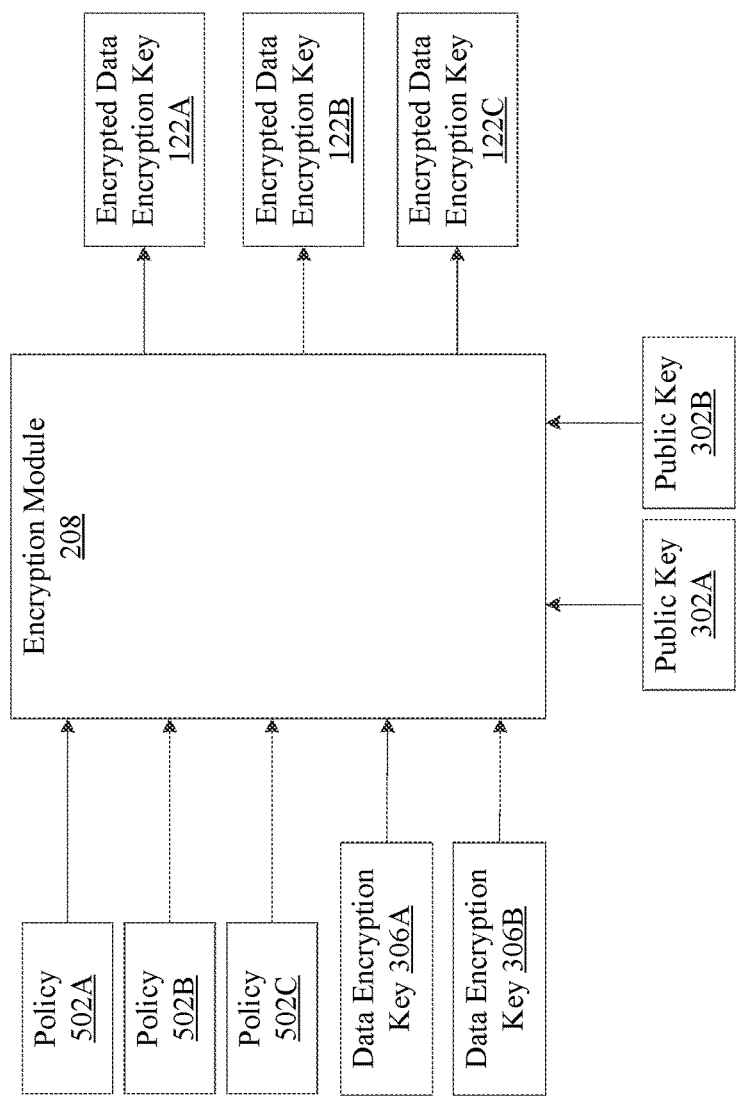

FIG. 6B is another block diagram 600B of an encryption module, according to an embodiment. As illustrated in FIG. 6B, encryption module 208 may receive policies 502A and 502B, and data encryption keys 306A and 306B. As also illustrated in FIG. 6B, encryption module 208 may access public keys 302A and 302B.

In one embodiment, encryption module 208 may encrypt data encryption key 306A into encrypted data encryption key 122A using policy 502A and public key 302A. As discussed in FIG. 5, policy 502A includes rules that are associated with attributes 402A and 402B.

In another embodiment, encryption module 208 may encrypt data encryption key 306A into encrypted data encryption key 122B using policy 502B and public key 302B. As discussed in FIG. 5, policy 502A includes rules that are associated with attributes 402C and 402D.

In yet another embodiment, encryption module 208 may encrypt data encryption key 306B into encrypted data encryption key 122C using policy 502C and public key 302B. As discussed in FIG. 5, policy 502C includes rules that are associated with attributes 402A and 402C.

The embodiments above that describe how encryption module 208 encrypts data encryption keys 306 are exemplary. Accordingly, the embodiments may also include other combinations of attributes 402, data encryption keys 306, public keys 302, and policies 502 that may be used to encrypt data encryption keys 306 into encrypted data encryption keys 122.

Figure 7A:
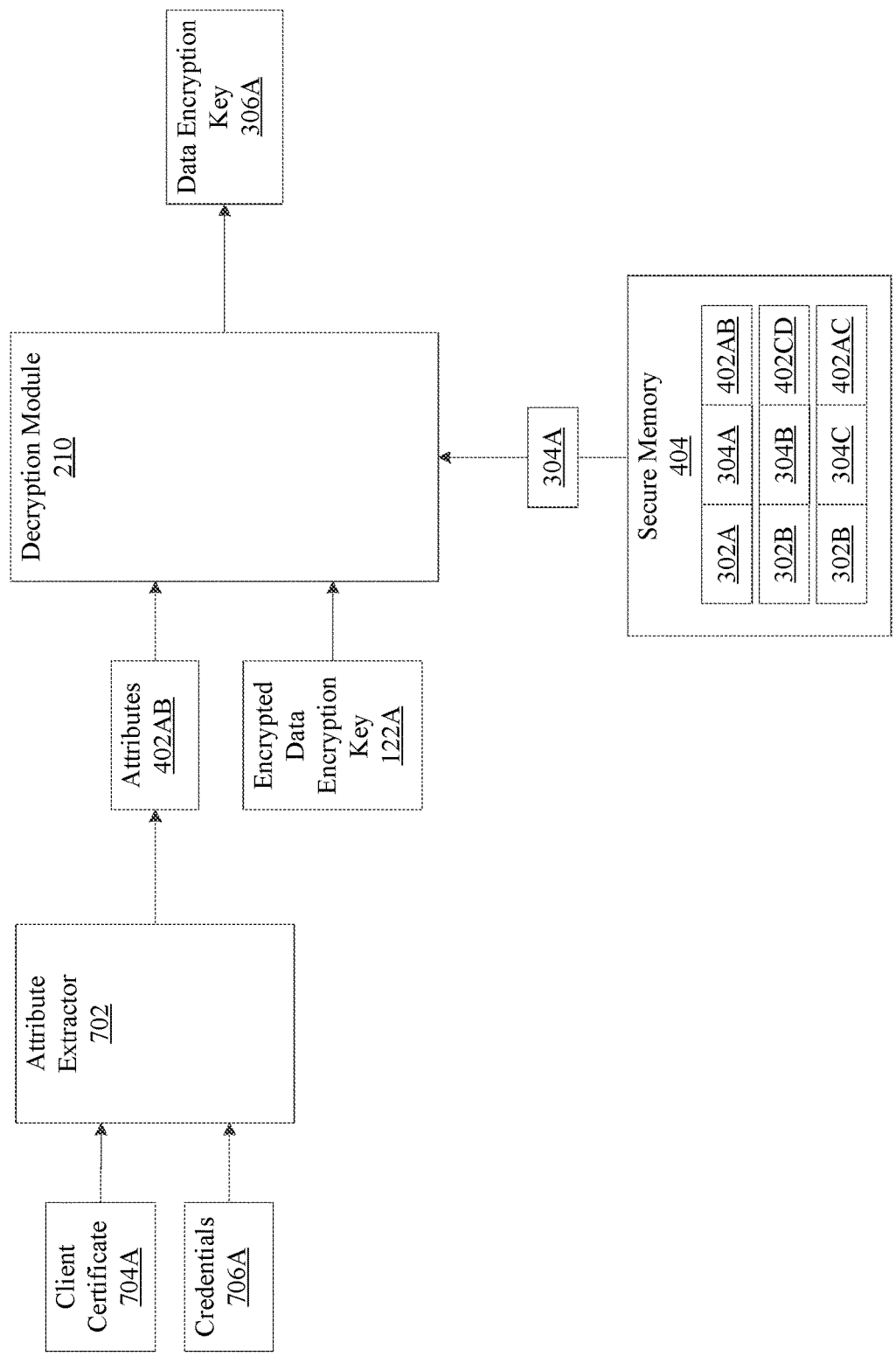
FIG. 7A-C are block diagrams of a decryption module, according to some embodiments.

Going back to FIG. 2, as discussed above key management system 116 includes decryption module 210 in one embodiment. In another embodiment, decryption module 210 may also be included in data storage 114 or data connector 118 discussed in FIG. 1 (not shown). FIG. 7A is a block diagram 700A of a decryption module, according to an embodiment. Decryption module 210 may decrypt encrypted data encryption key 122A into data encryption key 306A. As discussed above, once encrypted data encryption key 122A is decrypted back into data encryption key 306A, data encryption key 306A may decrypt the encrypted data into an original format that maybe read, displayed, and processed by application 108, application 112, and/or browser 110.

In an embodiment, decryption module 210 may receive attributes 402, such as attributes 402A and 402B and encrypted data encryption key 122A. Attributes 402A and 402B may be derived from an attribute extractor 702 in some embodiments. Attribute extractor 702 may be an application or software that executes that may execute on one of the components discussed in FIG. 1. For example, attribute extractor 702 may be included in data connector 118. In an embodiment, attribute extractor 702 may receive a client certificate 704A that includes attributes 402A and 402B and may extract attributes 402A and 402B from client certificate 704A in one embodiment. Example client certificate may be an X.509 certificate. In another embodiment, attribute extractor 702 may receive credentials 706A, such as user credentials, credentials associated with application 108 and/or application 112. Attribute extractor 702 may extract attributes 402A and 402B from credentials 706A. Example credentials may be a user identifier, an employer or employee identifier, a city, etc.

In an embodiment, once attribute extractor 702 extracts attributes 402, attribute extractor 702 may provide decryption module 210 with attributes 402 one by one, or compile attributes 402 into a list of attributes and provide the list of attributes.

In an embodiment, attribute extractor 702 may be located within data storage 114 or within data connector 118 discussed in FIG. 1 (not shown). Attribute extractor 702 may also be located in various components described in system 100.

In an embodiment, decryption module 210 may also receive encrypted data encryption key 122A. As discussed above, encrypted data encryption key 122A may be stored in data storage 114 (not shown). In this case, decryption module 210 may receive encrypted data encryption key 122A from data connector 118 (not shown). In other embodiments, encrypted data encryption key 122A may be received from other components in FIG. 1, such as server 106 or client device 104.

In an embodiment, decryption module 210 may use attributes 402, such as attributes 402A and 402B to determine whether private key 304 that corresponds to attributes 402A and 402B exists in secure memory 404. For example, decryption module 210 may determine that private key 304A exists in secure memory 404 and corresponds to attributes 402A and 402B. To determine whether secure memory 404 includes private keys 304 that correspond to attributes 402, decryption module 210 may map or compare attributes 402 received from attribute extractor 702 to attributes 402 that are associated with private keys 304 as discussed in FIG. 3.

Once decryption module 210 determines that private key 304A that corresponds to attributes 402A and 402B exists in secure memory 404, decryption module 210 may retrieve private key 304A. Decryption module 210 may then use attributes 402A and 402B and private key 304A to decrypt encrypted data encryption key 122A. In an embodiment, decryption module 210 may use private key 304A and attributes 402A and 402B to determine whether attributes 402A and 402B pass rules in policy 502A that public key 302A used to generate encrypted data encryption key 122A. For example, as discussed above, policy 502A may include rules that where attribute 402A should be greater than thirty, and attribute 402B should be less than 10. Accordingly, if the value of attributes 402A is greater than thirty and the value of attributes 402B is less than 10, then private key 304A may decrypt encrypted data encryption key 122A into data encryption key 306A. However, if the value of attribute 402A is twenty-five, then private key 304A may not decrypt encrypted data encryption key 122A.

In an embodiment, decryption module 210 may use the same algorithm to decrypt encrypted data encryption key 122A into data encryption key 306A as encryption module 208 used to encrypt data encryption key 306A into encrypted data encryption key 122A. Accordingly, one algorithm that may decrypt encrypted data encryption key 122A may include an attribute-based encryption scheme.

In an embodiment, once private key 304A decrypts encrypted data encryption key 122A into data encryption key 306A, key management system 116 may provide data encryption key 306A to data connector 118 discussed in FIG. 1, or another component in system 100 that may decrypt data. In case of data connector 118, data connector 118 may use data encryption key 306A to decrypt the encrypted data (not shown). Alternatively, data connector 118 may pass data encryption key 306A to data storage 114 and data storage 114 may use data encryption key 306A to decrypt the encrypted data (not shown). Data storage 114 may then use data connector 118 to transmit the decrypted data to application 108, application 112 and/or browser 110.

In an embodiment, where decryption module 210 does not decrypt encrypted data encryption key 122A because attributes 402A and 402B failed to pass the one or more rules in policy 502A, decryption module 210 may return encrypted data encryption key 122A to data connector 118 or data storage 114. In this case, data encryption key 306A remains encrypted as encrypted data encryption key 122A.

In an embodiment, if decryption module 210 determines that private key 304 that is associated with attributes 402A and 402B does not exist, decryption module 210 may cause key provisioning module to provision one of private keys 304 for attributes 402A and 402B.

As discussed above, decryption module 210 may also be located within data storage 114 or within data connector 118. In this case, data connector 118 may transmit attributes 402A and 402B to key management system 116 and use key management system 116 to determine whether private key 304A that corresponds to attributes 402A and 402B exists in secure memory 404. If private key 304A exists, then key management system 116 may transmit private key 304A to decryption module 210 within data connector 118 or data storage 114. Once decryption module 210 receives private key 304A, decryption module 210 may use private key 304A to decrypt encrypted data encryption key 122A by matching attributes 402A and 402B to the cipher text that includes the corresponding policy 502A.

Figure 7B:
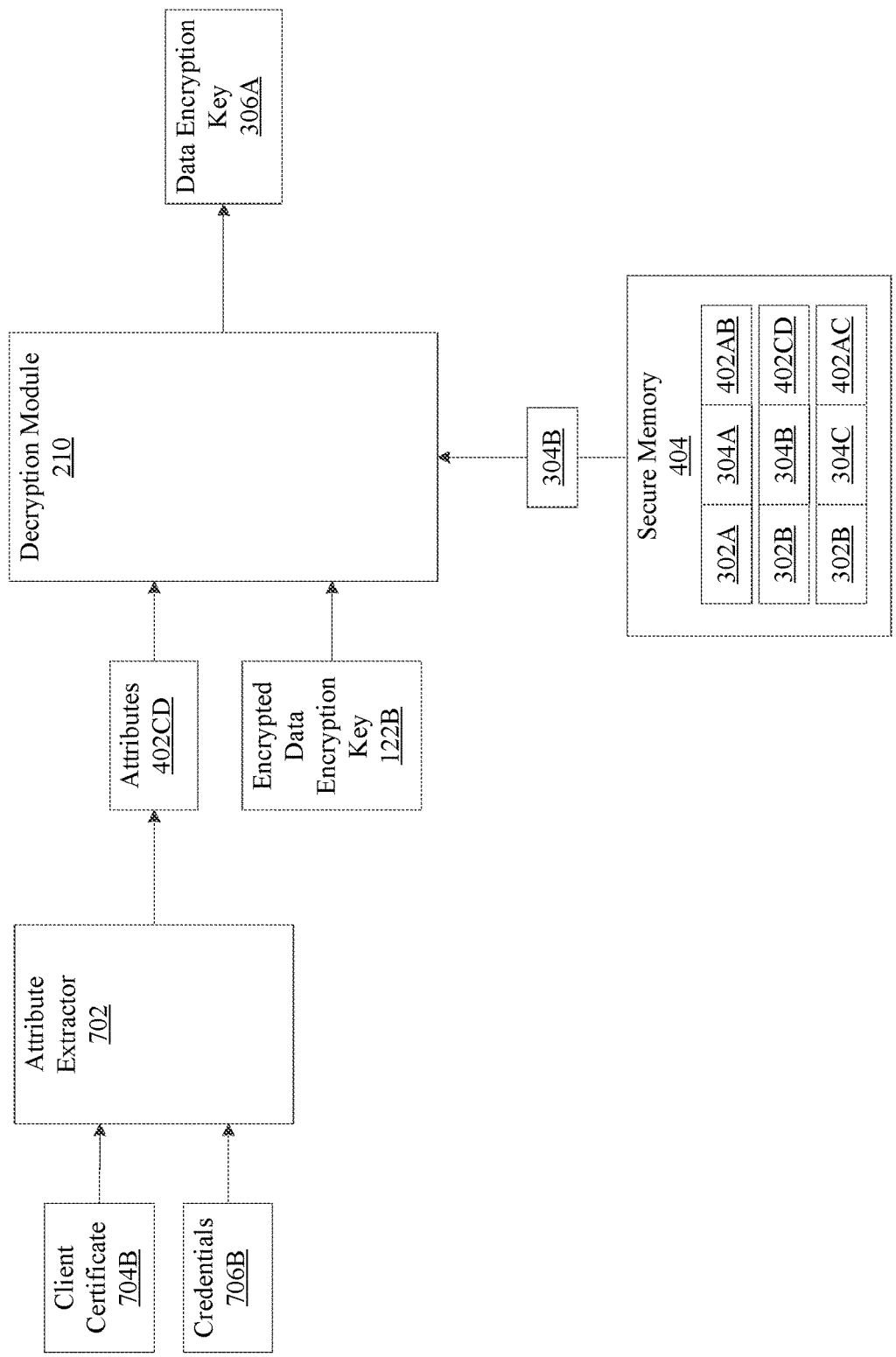

FIG. 7B is another block diagram 700B of a decryption module, according to an embodiment. In FIG. 7B, decryption module 210 may receive attributes 402C and 402D that attribute extractor 702 may have extracted from client certificate 704B or credentials 706B. In FIG. 7B, decryption module 210 may also receive encrypted data encryption key 122B that has been encrypted using public key 302B and policy 502B as discussed in FIG. 6B. Using attributes 402C and 402D, decryption module 210 may retrieve private key 304B that corresponds to public key 302B from secure memory 404. Decryption module 210 may then use private key 304B and attributes 402C and 402D to decrypt encrypted data encryption key 122B into data encryption key 306A according to policy 502B. As discussed above, if decryption module 210 is unable to decrypt encrypted data encryption key 122B because attributes 402C and 402D do not pass the rules in policy 502B, decryption module 210 may transmit encrypted data encryption key 122B to data storage 114 or another entity (not shown). Alternatively, decryption module 210 may securely transmit data encryption key 306A to data storage 114 that may use data encryption key 306A to decrypt data (not shown).

Figure 7C:
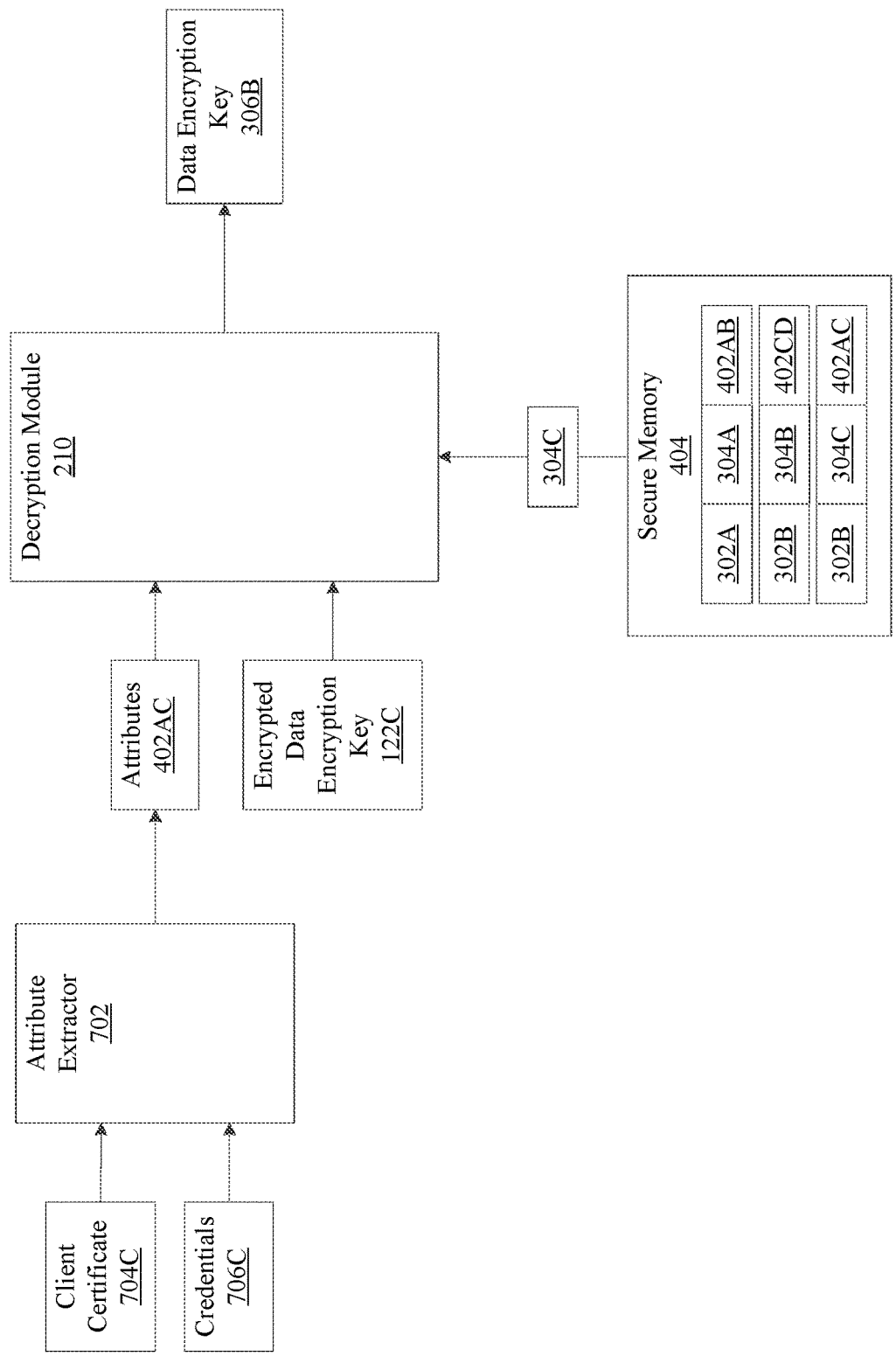

FIG. 7C is yet another block diagram 700C of a decryption module, according to an embodiment. In FIG. 7C, decryption module 210 may receive attributes 402A and 402C that attribute extractor 702 may have extracted from client certificate 704C or credentials 706C. In FIG. 7C, decryption module 210 may also receive encrypted data encryption key 122C that has been encrypted using public key 302B and policy 502C as discussed in FIG. 6B. Using attributes 402A and 402C, decryption module 210 may retrieve private key 304C that corresponds to public key 302B from secure memory 404. Decryption module 210 may then use private key 304B and attributes 402A and 402C to decrypt encrypted data encryption key 122C into data encryption key 306B according to policy 502C. As discussed above, if decryption module 210 is unable to decrypt encrypted data encryption key 122C because attributes 402A and 402C do not pass the rules in policy 502C, decryption module 210 may transmit encrypted data encryption key 122C to data storage 114 or another entity (not shown). Alternatively, decryption module 210 may transmit securely transmit data encryption key 306B to data storage 114 that may use data encryption key 306B to decrypt data (not shown).

The embodiments above that describe how decryption module 210 decrypts encrypted data encryption keys 122 into data encryption keys 306 are exemplary. Accordingly, the embodiments may also include other combinations of attributes 402, encrypted data keys 122, public keys 302 and private keys 304 that may be used to decrypt encrypted data encryption keys 122 into data encryption keys 306.

Figure 8:
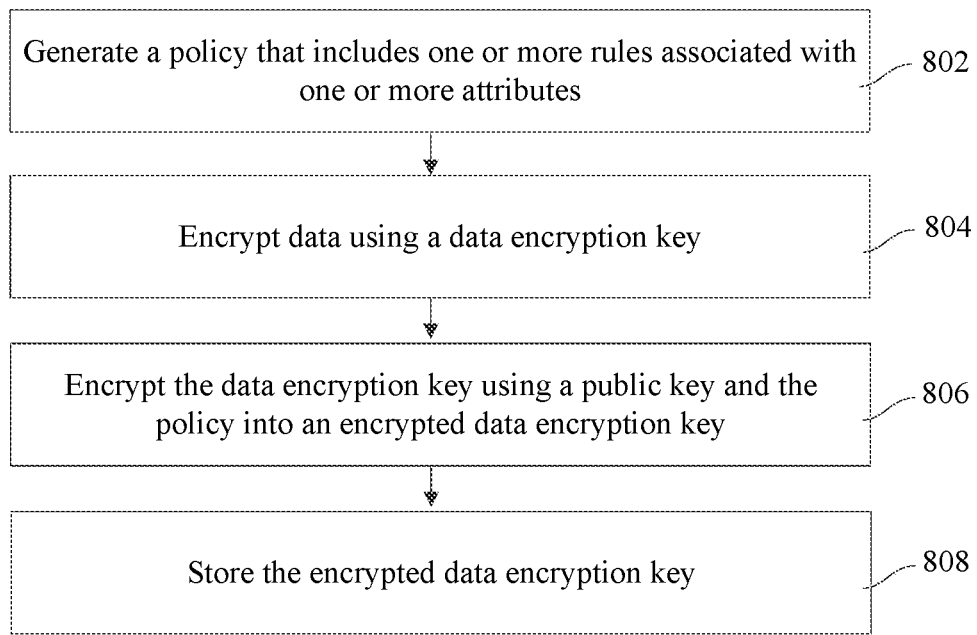
FIG. 8 is a flowchart of a method for encrypting data, according to an embodiment.

FIG. 8 is a flowchart of a method 800 for encrypting data, according to an embodiment. Method 800 may be performed using hardware and/or software components described in FIGS. 1-5, 6A-B and 7A-C. Note that one or more of the operations may be deleted, combined, or performed in a different order as appropriate. Prior to operation 802, data encryption key 306 and key encryption keys, such as pubic keys 302 and private keys 304 have been generated, and private keys 304 have been provisioned with corresponding attributes 402.

At operation 802, a policy is generated. For example, policy generator 206 may generate policy 502. As discussed above, policy 502 may include one or more rules that are associated with one or more attributes 402.

At operation 804, data is encrypted. For example, data from application 108 may be encrypted using data encryption key 306.

At operation 806, a data encryption key is encrypted. For example, key management system 116 may encrypt or wrap data encryption key 306 using public key 302 and according to policy 502 into encrypted data encryption key 122.

At operation 808, an encrypted data encryption key is stored. For example, encrypted data encryption key 122 may be transmitted and stored in data storage 114 or another component in FIG. 1.

Figure 9:
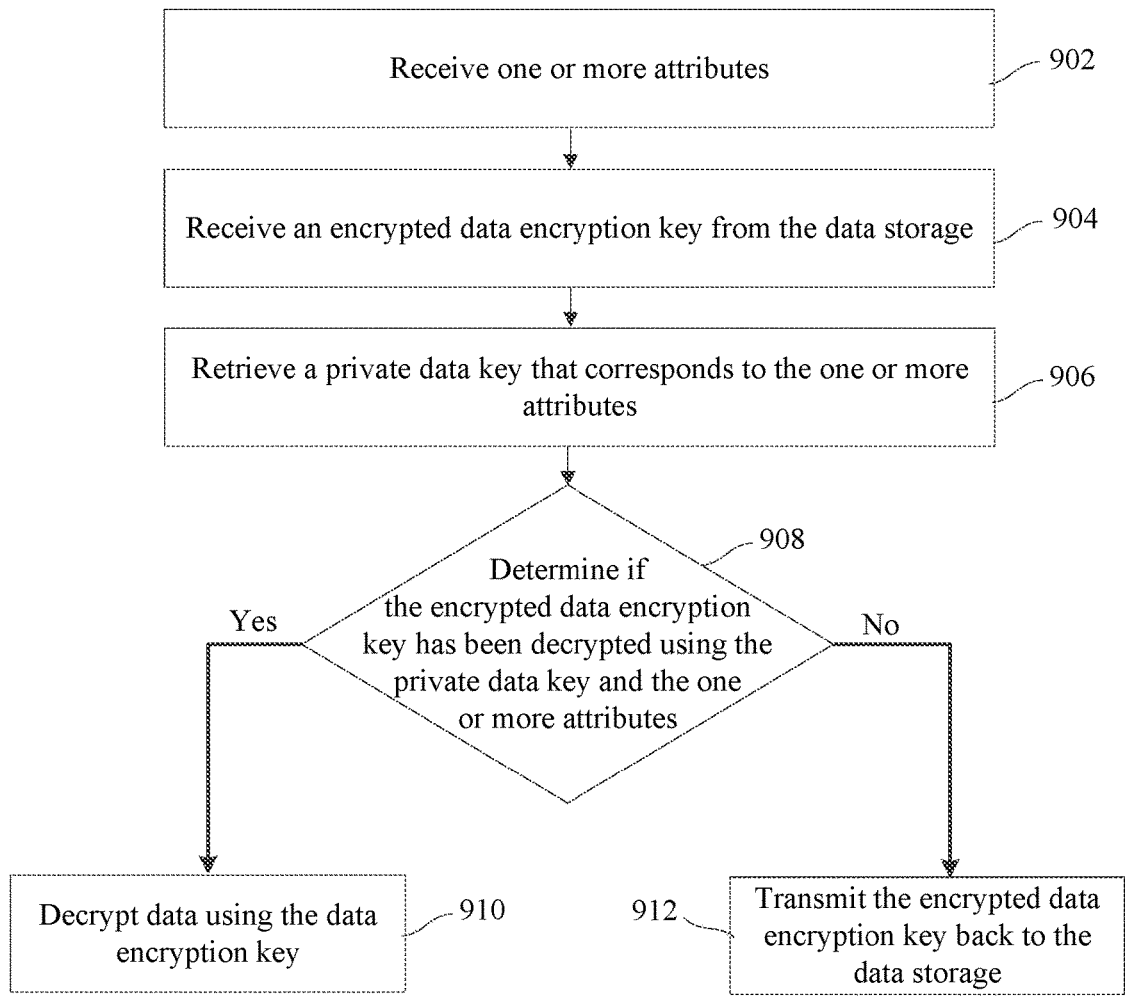
FIG. 9 is a flowchart of a method for decrypting data, according to an embodiment.

FIG. 9 is a flowchart of a method 900 for decrypting data, according to an embodiment. Method 900 may be performed using hardware and/or software components described in FIGS. 1-5, 6A-B, and 7A-C. Note that one or more of the operations may be deleted, combined, or performed in a different order as appropriate.

At operation 902, one or more attributes are received. For example, decryption module 210 may receive attributes 402A and 402B from attribute extractor 702. As discussed above, attribute extractor 702 may retrieve attributes from client certificate 704A or credentials 706A provided to attribute extractor 702 by application 108 or 112 or by computing device 104 under control of a user.

At operation 904, an encrypted data encryption key is received. For example, decryption module 210 receives encrypted data encryption key 122. As discussed above, encrypted data encryption key 122 may be received from data storage 114 or another component in system 100.

At operation 906, a private key that corresponds to attributes is retrieved. For example, decryption module 210 retrieves private key 304A that corresponds to attributes 402A and 402B.

At operation 908, a determination whether the encrypted key encryption key was unwrapped is made. For example, as part of decrypting encrypted data encryption key 122 decryption module 210 determines whether one or more rules in policy 502A that was used to encrypted data encryption key 122 during encryption are passed using attributes 402A and 402B. If the one or more rules in policy 502A are passed, the decryption module 210 unwraps encrypted data encryption key 122 into data encryption key and method 900 proceeds to operation 910. Otherwise to operation 912.

At operation 910, data is decrypted. As discussed above, once decrypted, data encryption key 306 may be transmitted to data connector 118 or another component in system 100. Data connector 118, data storage 114, or another component may use data encryption key 306 to decrypt the data.

At operation 912, an encrypted data encryption key is returned. For example, when decryption module 210 does not decrypt encrypted data encryption key 122, decryption module 210 transmits encrypted data encryption key 122 to data storage 114 or another component in system 100.

Figure 10:
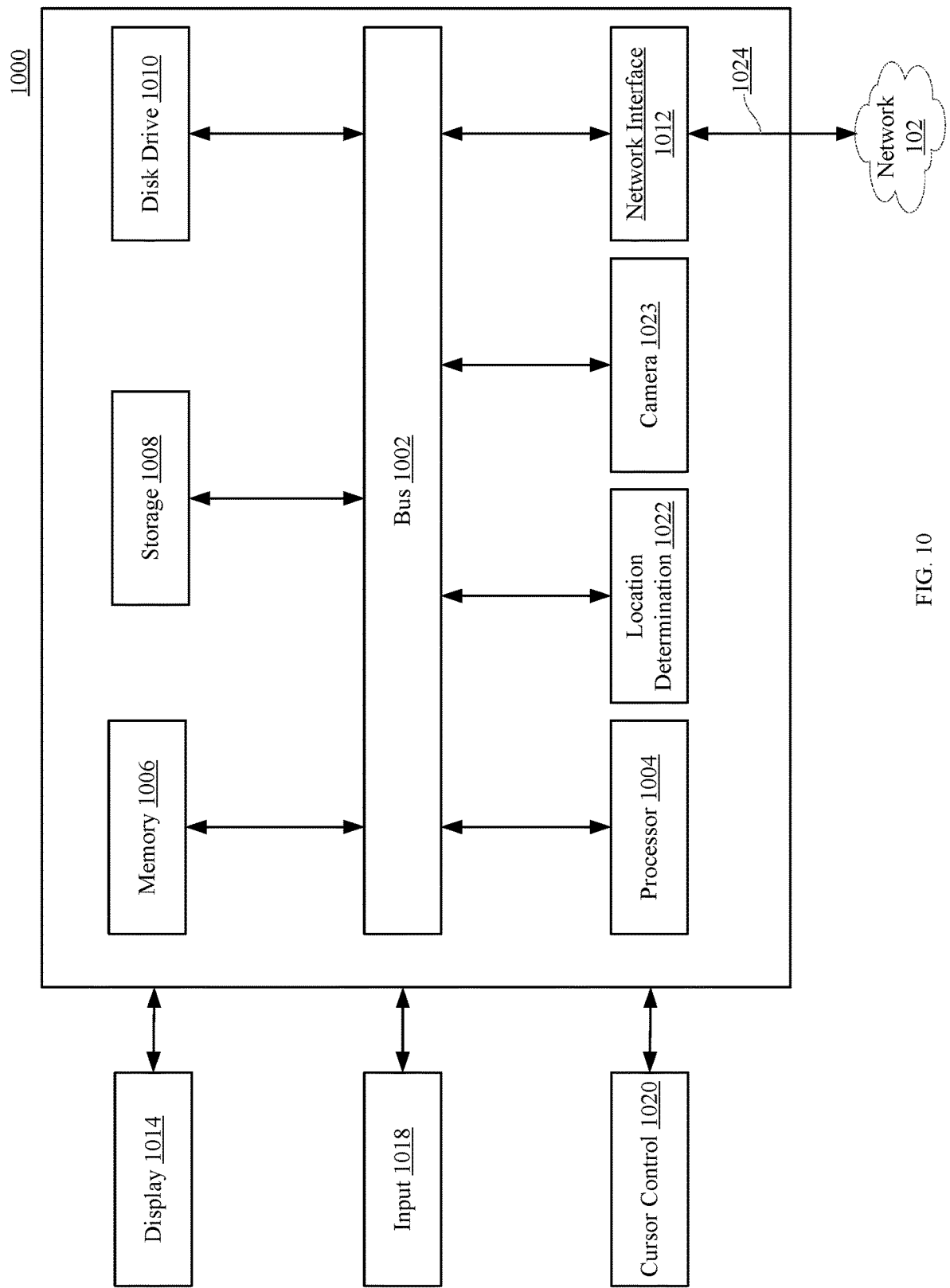
FIG. 10 is a block diagram of a computer system suitable for implementing one or more components or operations in FIGS. 1-9 according to an embodiment.

Referring now to FIG. 10 an embodiment of a computer system 1000 suitable for implementing, the systems and methods described in FIGS. 1-5, 6A-B, 7A-C, and 8-9 are illustrated.

In accordance with various embodiments of the disclosure, computer system 1000, such as a computer and/or a server, includes a bus 1002 or other communication mechanism for communicating information, which interconnects subsystems and components, such as a processing component 1004 (e.g., processor, micro-controller, digital signal processor (DSP), graphics processing unit (GPU), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), a location determination component 1022 (e.g., a Global Positioning System (GPS) device as illustrated, a cell tower triangulation device, and/or a variety of other location determination devices known in the art), and/or a camera component 1023. In one implementation, the disk drive component 1010 may comprise a database having one or more disk drive components.

In accordance with embodiments of the disclosure, the computer system 1000 performs specific operations by the processing component 1004 executing one or more sequences of instructions contained in the system memory component 1006, such as described herein with respect to the mobile communications devices, mobile devices, and/or servers. Such instructions may be read into the system memory component 1006 from another computer readable medium, such as the static storage component 1008 or the disk drive component 1010. In other embodiments, hard-wired circuitry may be used in place of or in combination with software instructions to implement the disclosure.

Logic may be encoded in a computer readable medium, which may refer to any medium that participates in providing instructions to the processing component 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 1000. In various other embodiments of the disclosure, a plurality of the computer systems 1000 coupled by a communication link 1024 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
   at least one non-transitory memory storing instructions; and
   one or more hardware processors coupled to the at least one non-transitory memory and configured to read the instructions from the at, least one non-transitory memory to cause the system to perform operations comprising:
      receiving a policy that includes an attribute;
      associating a first asymmetric key with a second asymmetric key;
      associating the second asymmetric key with the attribute in the policy;
      receiving a data encryption key configured to encrypt data for secure storage;
      generating an encrypted data encryption key by wrapping the data encryption key using the first asymmetric key and the policy, wherein the encrypted data encryption key is unwrapped into the data encryption key using the second asymmetric key and the attribute associated with the policy;
      receiving a second policy that includes a second attribute different from the attribute included in the policy;
      generating a second encrypted data encryption key by wrapping the data encryption key using the first asymmetric key and the second policy; and
      transmitting data encrypted using the second data encryption key to the secure storage.

2. The system of claim 1, wherein the operations further comprise:
   associating at least one rule in the policy with the attribute.

3. The system of claim 1, wherein the first asymmetric key is a public key and the second asymmetric key is a private key.

4. The system of claim 1, wherein the first asymmetric key is a private key and the second asymmetric key is a public key.

5. The system of claim 1, wherein
   the second policy further includes the attribute; and
   the operations further comprise:
      associating the first asymmetric key with a third asymmetric key;
      associating the third asymmetric key with the attribute and the second attribute included in the second policy; and
      generating a third encrypted data encryption key by wrapping the data encryption key using the first asymmetric key and the second policy, wherein the encrypted data encryption key is unwrapped into the data encryption key using the third asymmetric key, the attribute and the second attribute that are associated with the second policy.

6. The system of claim 1, wherein the operations further comprise:
   receiving a third policy that includes the attribute and the second attribute; and
   generating a third encrypted data encryption key be wrapping the data encryption key using the first asymmetric key and the third policy.

7. The system of claim 1, wherein the attribute is associated with a credential from an application that accesses data stored as the encrypted data.

8. The system of claim 1, wherein the second encrypted data encryption key is unwrapped into the data encryption key using a third asymmetric key and the second attribute associated with the second policy.

9. A system comprising:
   one or more non-transitory memories storing instructions; and
   one or more hardware processors coupled to the one or more non-transitory memories and configured to read the instructions from the one or more non-transitory memory to cause the system to perform operations comprising:
      receiving an attribute and an encrypted data encryption key, the encrypted data encryption key being encrypted based on a first asymmetric key and a policy that includes a rule associated with the attribute;

identifying a second asymmetric key using the attribute;

unwrapping the encrypted data encryption key into a data encryption key using the second asymmetric key, wherein the unwrapping determines that the rule in the policy matches the attribute;

receiving a second attribute, and a second encrypted data encryption key, the second encrypted data encryption key being encrypted using the first asymmetric key and a second policy that includes a rule associated with the second attribute;

identifying, using the second attribute, a third asymmetric key;

unwrapping the second encrypted data encryption key into the second data encryption key using the third asymmetric key, wherein the unwrapping determines the rule in the second policy that matches the second attribute; and decrypting encrypted data with the data encryption key and second encrypted data with the second data encryption key.

10. The system of claim 9, wherein the operations further comprise:
receiving a client certificate, wherein the client certificate is associated with an application that uses data encrypted using the data encryption key; and
extracting the attribute from the client certificate.

11. The system of claim 9, wherein the operations further comprise:
receiving a credential, wherein the credential is associated with an application that uses data; and
extracting the attribute from the credential.

12. The system of claim 9, wherein the operations further comprise:
providing the data encryption key to a data storage; and
decrypting data using the data encryption key.

13. The system of claim 9, wherein the operations further comprise:
transmitting the identified second asymmetric key to a data storage; and
wherein the unwrapping occurs at the data storage.

14. The system of claim 9, wherein the first asymmetric key is associated with the second asymmetric key and the third asymmetric key.

15. The system of claim 9, wherein the second asymmetric key and the third asymmetric key are private keys.

16. The system of claim 5, wherein the operations further comprise:
associating at least one rule in the second policy with the attribute and the second attribute.

17. A method comprising:
accessing a policy that includes at least one rule associated with at least one attribute;
determining a plurality of private keys associated with a public key, wherein each private key is associated with one or more attributes;
wrapping a data encryption key that encrypts data with the public key and the policy into an encrypted data encryption key, wherein the encrypted data encryption key is unwrapped using a first private key in the plurality of private keys selected based on a match between a first attribute in the at least one attribute in the policy and a first attribute of the one or more attributes associated with the first private keys;
wrapping a second data encryption key that encrypts second data with the public key and the policy into a second encrypted data encryption key, wherein the second encrypted data encryption key is unwrapped using a second private key in the plurality of private keys selected based on a match between a second attribute in a second policy and a second attribute of the one or more attributes associated with the second private key; and
transmitting the encrypted data encryption key and the second encrypted data encryption key to at least one secure data storage.

18. The method of claim 17, further comprising:
receiving the attribute from an application;
selecting the first private key from the plurality of private keys associated with the public key using the attribute; and
unwrapping the encrypted data encryption key into the data encryption key using the first private key, wherein the unwrapping compares the attribute to the at least one rule in the policy.

19. The method of claim 18, further comprising:
accessing encrypted data; and
decrypting the encrypted data using the data encryption key.

* * * * *